United States Patent

[11] 3,595,557

| | | |
|---|---|---|
| [72] | Inventor | Dennis Daniels<br>Williamsville, N.Y. |
| [21] | Appl. No. | 789,893 |
| [22] | Filed | Jan. 8, 1969<br>Division of Ser. No. 619,348, Feb. 28, 1967,<br>Pat. No. 3,456,536. |
| [45] | Patented | July 27, 1971 |
| [73] | Assignee | Houdaille Industries, Inc. |

[54] WORKPIECE CLAMP ASSEMBLY
6 Claims, 11 Drawing Figs.

[52] U.S. Cl. .................................................. 269/32,
269/55, 214/1 BB
[51] Int. Cl. ................................................. B23q 3/08
[50] Field of Search .......................................... 269/55, 56,
32; 214/1 BB

[56] References Cited
UNITED STATES PATENTS
1,822,501  9/1931  Onsrud ........................... 269/32 X 1,967,507  7/1934  Hibbard ........................... 269/55 X
FOREIGN PATENTS
544,693   1942   Great Britain ................. 269/55

*Primary Examiner*—Andrew R. Juhasz
*Assistant Examiner*—Donald D. Evenson
*Attorney*—Hill, Sherman, Meroni, Gross & Simpson ABSTRACT: A machine tool has a workpiece-positioning mechanism including a carrier which is reciprocated in one axis to position the workpiece which is held by a clamp assembly. The clamp assembly is mounted on the carrier to be free to move vertically. The clamp assembly includes clamp members which move vertically to engage opposite sides of the workpiece, and which can draw the workpiece against a locating surface on the clamp assembly. The clamp assembly is arranged to be fluidly locked at a selected position along the length of the carrier, and an elongated tray is provided to support a flexible hose for powering the actuator portion and the fluid lock.

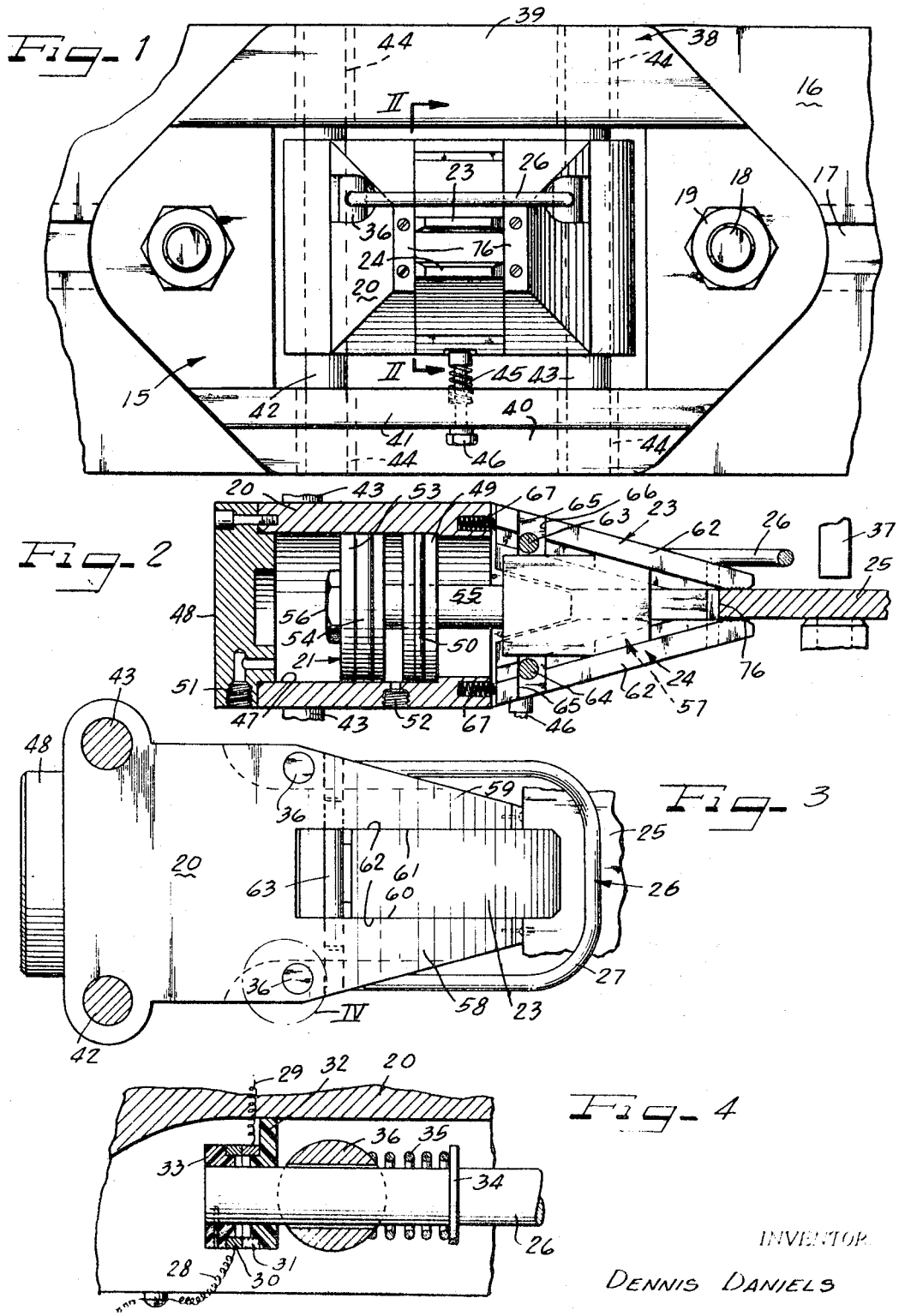

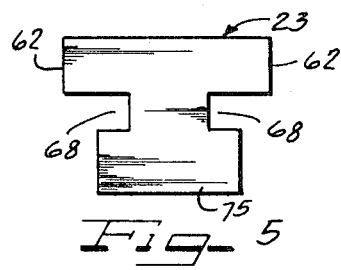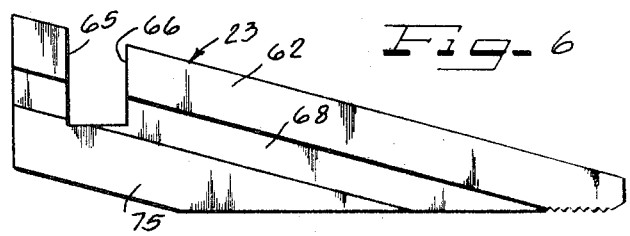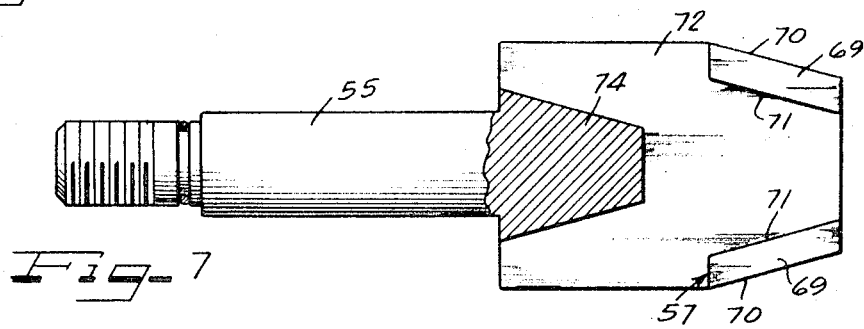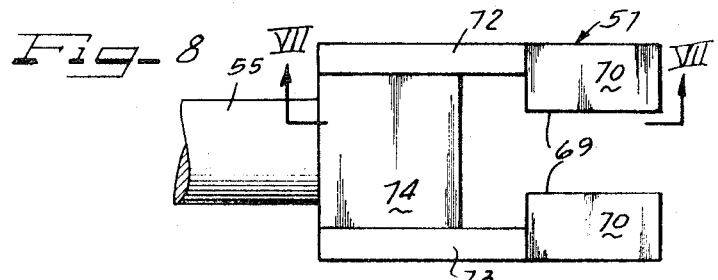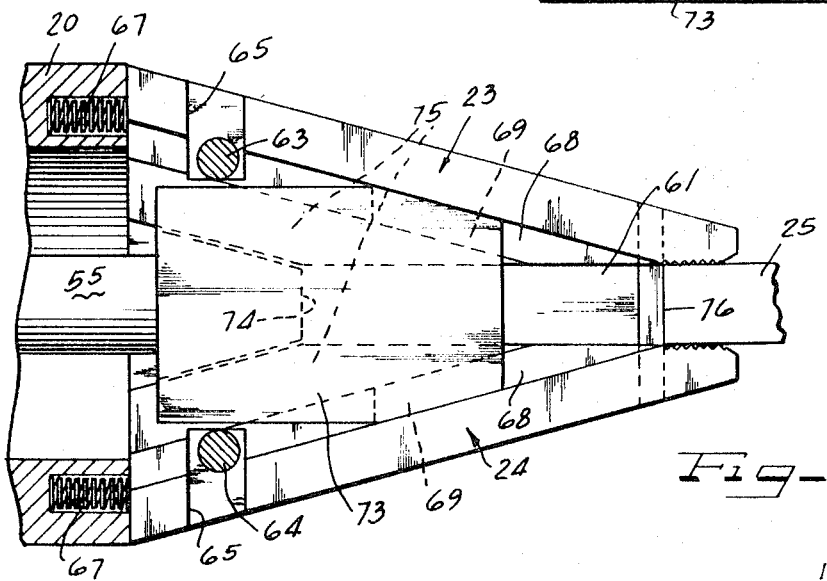
INVENTOR
DENNIS DANIELS

PATENTED JUL 27 1971    3,595,557

INVENTOR
DENNIS DANIELS

BY Hill, Sherman, Meroni, Gross & Simpson  ATTORNEYS

WORKPIECE CLAMP ASSEMBLY

This application is a division of my copending application of the same title, filed Feb. 28, 1967, now U.S. Pat. No. 3,456,536.

BACKGROUND OF THE INVENTION

1. Field of the Invention

This invention relates to a workpiece clamp assembly for use on a machine tool, by which clamp assembly the workpiece is grasped and moved about from position to position.

2. Prior Art

A prior art device with which I am particularly familiar is that shown in may U.S. Pat. No. 3,176,973, owned by the assignee of the present invention. That clamping mechanism is particularly advantageous when employed with a manually controlled machine tool, such as a punch press of the template type. However, when such a punching machine is numerically controlled, and when the size of the punching machine increases, certain problems arise. Theoretically, it would be desirable to be able to punch or otherwise machine any portion of a workpiece. However, when the workpiece is moved about by power-driven means, the clamp mechanism that grasps the workpiece must of necessity create a type of "blind spot" where the clamping members overlie or underlie the workpiece. For automatic machining, it is thus necessary for the programmer to control where the clamps are located.

If the workpiece is relatively large, it usually is not absolutely flat, and may be expected not to be as close to ideally flat as is the accurate-positioning mechanism used to moved the workpiece about. Thus clamping forces provided by two adjacent clamp assemblies can produce a resultant force on the positioning mechanism which is not conducive to long life. Further, when a workpiece is punched that is not absolutely flat, the heavy punching forces urge the workpiece into flatwise engagement with the die, thereby transmitting forces through the workpiece clamp to such workpiece positioning mechanism.

The prior clamp mentioned above is manually operated as it is employed with a relatively small machine used on relatively light material. However, as the workpiece area increases, it becomes difficult or impossible to reach a clamp manually, and as the press tonnage is increases, the press is enable to punch heavier gauges of sheet metal. Manual adjustment was provided previously to facilitate use of the prior clamping mechanism over a certain range of sheet metal thicknesses.

In the prior device mentioned, the workpiece can be positioned at a selected place along the length of a carrier and manually locked in such position. However, as the size of machine is increased, manual access is not necessarily convenient, clamping forces tend to become at times high, and are incompatible with certain types of programming wherein the position of the workpiece clamp must be changed automatically during a punching program.

SUMMARY

In accordance with the present invention, I have provided a structure which overcomes the problems described above. I have provided support means for the clamp assembly which eliminate all freedoms of motion of the clamp assembly as a unit except leaving it relatively free to move in a vertical direction, thereby minimizing the transfer of unwanted forces to the positioning mechanism. Further, I have provided a construction for the clamp members by which they can be power actuated, such construction enabling the reception of any thickness of workpiece within the capacity of the machine tool without readjustment. Further, I have provided power actuated locking means by which the workpiece clamp may be locked to its carrier by means of remote control. The provision of the foregoing features has created a new problem in bringing pressurized fluid to the device, and I have therefore provided a tray for a U-shaped flexible hose which is of such construction as to be compatible with the foregoing features.

Accordingly, it is an object of the present invention to provide a workpiece clamp assembly which may be employed to grasp a workpiece clamp assembly for moving it about and for moving it to and holding it in predetermined positions with respect to a machine tool.

A further object of the present invention is to provide a workpiece clamp assembly which will minimize forces originating in or on the workpiece which otherwise would be transmitted to the workpiece-positioning mechanism, such forces typically being derived from slightly warped workpieces.

A still further object of the present invention is to provide a remotely actuatable workpiece clamp assembly.

Yet another object of the present invention is to provide a workpiece clamp assembly which will automatically compensate for variations in workpiece thickness.

Another object of the present invention is to provide a workpiece clamp assembly which can be remotely locked to a carrier forming a part of the workpiece-positioning mechanism.

A still further object of the present invention is to the provision of means by which pressurized fluid may be brought to a workpiece clamp assembly which is capable of being adjusted in position in a horizontal axis, and which is capable of moving vertically.

Yet another object of the present invention is to provide a workpiece clamp assembly which will automatically compensate for the effect of the use of dies of various heights, which will vary due to sharpening, and which variation otherwise produces results corresponding to those of a warped workpiece discussed above.

ON THE DRAWINGS

FIG. 1 is a front elevational view of a workpiece clamp assembly provided in accordance with the principles of the present invention;

FIG. 2 is a cross-sectional view thereof taken along line II–II of FIG. 1, with a punch, die and workpiece added;

FIG. 3 is a top plan view of the structure shown in FIG. 2;

FIG. 4 is an enlarged fragmentary cross-sectional view of a portion generally indicated as lying within a circle shown at IV in FIG. 3;

FIGS. 5 and 6 are views of the end and of the side of a clamp member shown in FIGS. 1—3;

FIGS. 7 and 8 are side and top views of an actuating rod having cam surface means, FIG. 7 being partially in cross section taken along line VII–VII of FIG. 8;

FIG. 9 is an enlarged fragmentary view of a portion of FIG. 2 showing the parts in a slightly different position;

Figure 10:
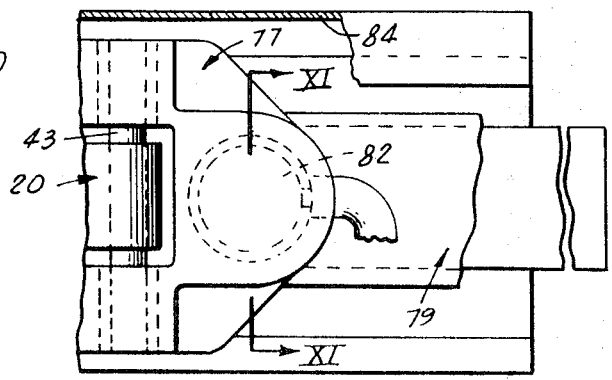
Figure 11:
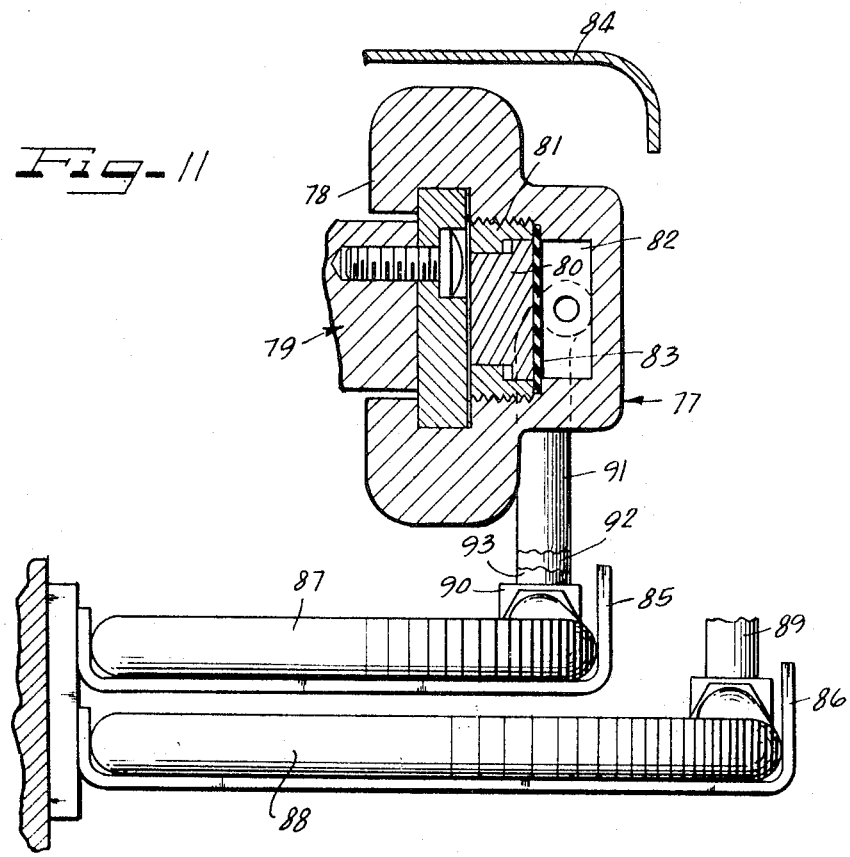

FIG. 10 corresponds to a portion of FIG. 1 in reduced scale, showing the preferred form of structure for locking the clamp assembly to the carrier; and FIG. 11 is an enlarged cross-sectional view taken along line XI–XI of FIG. 10, with parts added.

AS SHOWN ON THE DRAWINGS

The principles of this invention are particularly useful when embodied in a workpiece clamp assembly for machine tools, generally indicated by the numeral 15. A typical machine tool which may employ this clamp assembly 15 to advantage is a numerically controlled punching machine which has a workpiece-positioning mechanism that includes an elongated movable carrier or carrier portion 16 which is reciprocated along its length, namely from the left to the right and vice versa as shown in FIG. 1. The carrier 16 has been illustrated as having a T-slot 17 which received the head of T-bolt 18 to enable the clamp assembly 15 to be secured thereto as by a nut 19. The T-slot and bolt structure 17—19 may be considered schematic in nature as a preferred embodiment includes somewhat more sophisticated structure described below and shown in FIGS. 10 and 11.

The clamp assembly includes a housing or housing unit 20 which is secured to the carrier 16 as described more fully below. Within the housing 20, there is powered actuator 21 (FIG. 2) which is carried by the housing 20 and which is connected to at least one and preferably two clamp members 23, 24 which are provided with structure by which each moves vertically toward and away from the workpiece 25, the clamp members 23, 24 being carried by the housing and operatively connected to the actuator 21, all as described more fully below.

A resiliently yieldable bumper 26 is carried by the housing 20 and includes a generally U-shaped portion 27. Means are connected to the bumper which are responsive to the yielding thereof for controlling the machine tool, here illustrated as comprising a portion of a circuit that includes one conductor 28 and a second conductor 29 respectively connected to a pair of contacts 30, 31. The contact 31 is held in a fixed position by an insulator 32 carried by the housing 20 while the contact 30 is carried by an insulator 33 secured to one end of the bumper 26. Each leg of the bumper 26 carries a snap ring 34 against which a spring 35 acts, the spring 35 being reacted on by a support pin 36 secured to the housing 20. This feature is described more fully in the aforementioned parent application.

The clamp assembly 15 includes means by which the housing or housing unit 20 may move vertically to compensate for variations in die heights and warped workpieces, and to this end, the means by which the housing unit 20 is secured to the carrier 16 includes a rigid adapter unit generally indicated at 38. The adapter unit 38 is disposed against the carrier 16 and is secured thereto as previously described by the means 17—19. The adapter unit 38 includes an upper forwardly projecting portion 39 and a lower forwardly projecting portion 40, the latter having a still further forwardly projecting extension 41. The portions 39 and 40 are thus vertically spaced, and it is between these portions and partially in an aperture disposed therebetween that the housing unit 20 is disposed and supported. To this end, there is provided vertical guide rod means, namely a pair of rods 42, 43 each of circular cross section, each extending into and through the housing or housing unit 20, and each extending at its opposite ends or upper and lower ends into the adapter 38. The adapter 38 is provided with bearing means 44 of a conventional type which provide a slide fit for the ends of the rods 42, 43. The guide rods 42, 43 are rigidly secured to the housing 20. By this type of guide structure, the housing 20 is enable to move solely in the vertical direction and has no freedom to move in either horizontal direction. It is to be understood that some of these elements could be reversed, but the arrangement described and illustrated is preferable. The extension 41 on the adapter unit 38 carries a spring 45 which acts between the adapter unit 38 and the housing unit 20 to support the housing unit at a generally central position within its range of vertical movement, from which supported position the housing unit 20 may move upwardly or downwardly due to forces derived from the workpiece, the spring 45 yielding to enable any such downward movement. The spring 45 is with a screw adjustment 46 by which the normal or initial position of the housing unit 20 may be adjusted or selected.

The housing 20 has a cylindrical bore 47 which is closed at one end by an end cap 48 and at the other end by a second end cap 49 which is seated against an internal shoulder in the bore 47. The end cap 49 is provided with an O-ring 50 which serves as a seal, and sealing means likewise are provided for the end cap 48. The end cap 48 has a port 51, while a port 52 in the housing 20 leads into the cylindrical bore 47 on the opposite side of a piston 53 which similarly has an O-ring 54 which provides a seal between the ports 51, 52. A piston rod 55 has sliding seal (not shown) with the end cap 49, and at one end is threaded and is secured to the piston 53 by means of a nut 56. At the other end of the piston rod 55, there are camming surface means generally indicated at 57, shown in detail in FIGS. 7 and 8. The piston 53 moves in one horizontal direction which is toward and away from the edge of the workpiece 25.

At its front side, the housing 20 has a pair of forwardly extending arms 58, 59 which have a pair of horizontally spaced parallel vertical walls 60, 61 which slidably engage the lateral surfaces 62 of the clamp members 23, 24. There is provided a pin and slot connection between the housing 20 and the clamp members 23, 24, the slot of which extends vertically. To this end, the housing 20 has a pair of rigid pins 63, 64, which are fixedly carried thereby, and which span the space between the walls 60, 61. Each of the clamp members 23, 24 has a vertical slot defined by a rear wall 65 and a front wall 66, the spacing between the walls 65, 66 being greater than the diameters of the pins 63, 64. The housing 20 has a pair of springs 67 which act between the housing 20 and the rear face or end of each of the clamp members 23, 24 ro urge each of them to a normal position where the edges 65 of the slots engage the pins 63, 64 as shown in FIG. 2. The clamp members 23, 24 are thus guided between the arms 58, 59 for vertical movement toward each other and away from each other with the pints 63, 64 being engaged by the rear edge 65 of the slot-defining means. The springs 67 thus urge the clamp members 23, 24 in a horizontal direction, such direction being to the right as illustrated in FIG. 2.

Each of the clamp members 23, 24 has at least one laterally opening groove 68, 68, best seen in FIGS. 5 and 6, and where tow grooves are provided as here, the grooves 68 open in opposite lateral directions. The cam surface means 57 includes for each clamp member 23, 24, a sloping rib 69 for each groove 68, and each rib 69 has oppositely facing camming or actuating surfaces 70, 71. The piston 53 being movable in a horizontal direction, and the clamp members being guided for movement in a vertical direction, the laterally opening grooves 68 and the ribs 69 have a slope which is intermediate such directions, and which preferably is closer to the direction in which the piston is movable. Thus the angle between the cam surface means and the direction in which the piston 53 is movable is less than 45°, thereby providing a force amplification. During reciprocation of the rod 55, the actuating surfaces 70 engage the outer side of the grooves 68 as the rod moves to the right as shown, while the actuating surfaces 71 engage the inner surfaces of the groove 68 as the piston rod 55 moves to the left as shown. Thus the cam surface means 57 acts on each clamp member to move it or them toward and way from the workpiece 25. The extent to which the serrated jaws of the forward ends of the clamp members 23, 24 are separated is thus twice the amount that each clamp member is moved alone, thereby accommodating a wide range of thicknesses of workpiece, the center of the workpiece gap being stationary when opposed clamp members are used, but not if only one clamp member 23 is used.

As best seen in FIGS. 7 and 8, the ribs 69 are four in number, one being arranged above the other at opposite sides of the clamp members 23, 24. The four ribs 69 form an integral part of a pair of sideplates 72, 73 which are integral with a connecting portion 74 which is integral with the rod 55. The outer surfaces of the plate portions 72, 73 are slidably guided by the walls 60, 61 on the housing 20, and the central portion 75 of each clamp member 22, 23 which defines the inner side of the grooves 68 is disposed between the slidably guided by the inner surfaces of the plate portions 72, 73.

To the forward end of each of the arms 58, 59 of the housing 20, there is secured a pair of hardened members which together comprise a locating surface 76 for the workpiece 25 which faces and engages the adjacent edge thereof. The portions of the work clamps 23, 24 which overlie and underlie the workpiece 25 extend beyond the locating surface 76.

When the powered actuator 21 is reciprocated to the right as shown in FIG. 2, the clamp members 23, 24 are cammed apart, the one moving straight upwardly, and the other moving straight downwardly, thereby releasing their grip on the workpiece 25, and opening to a position limited by engagement of the pins 63, 64 with the closed ends of their respectively slots. Thereafter, a further workpiece is placed against the locating surface 76, and the piston 53 of the powered actuator 21 is moved to the left as shown in FIG. 2, thereby enabling the cam means 57 to draw the clamp members 23, 24 toward each other by an amount limited by their engagement with the workpiece 25. In the event that the edge of the workpiece 25 was not firmly seated against the locating surface 76, there would be a slight gap present at the moment that the workpiece 25 is engaged by the clamp member 23, 24. However, the power available from the power actuator 21 is considerable, and subject to overcoming the preload of the spring 67, the clamp members 23, 24 would be further drawn to the left and would draw the workpiece 25 with them toward the left as shown in FIG. 2 until a position is reached wherein the edge of the workpiece 25 is in contact with the locating surface 76. If the grip on the workpiece is form, such engagement would stall further movement of the actuator piston 53, while if the power available is considerable so that slippage could take place at the serrations on the clamp members 23, 24, such clamp members would continue to move to the left until they reach a limiting position wherein the end of each clamp members 23, 24 engages the adjacent side of the housing 20, all as shown in FIG. 9. To obtain this result, the clearance between each pin 63, 64 and the slot wall 66 should be no less than the clearance between the housing 20 and the clamp members 23, 24 at the springs 67.

In a preferred embodiment, the housing 20 has an adapter unit 77 which has rigid means 78 partially surrounding the carrier 79, the adapter unit 77 being disposed at one side of the carrier 79 and thus having the rigid means 78 engaging the opposite side thereof. The carrier 78 is shown in FIGS. 10 and 11 to have a different configuration, but as before, the adapter unit 77 is slidable along the length thereof. In this variation of the invention, there is provided at least one locking member 80 in the form of a plug which has at one end a flange which is captured by a flanged threaded bushing 81 in a manner to enable it to reciprocate. The plug 80 can thus move to and from the carrier 79 to engage it and to release it. In order to reciprocate the plug 80, there are provided expansible chamber means 82 in the rigid adapter unit, one side of the expansible chamber 82 being provided by a diaphragm 83 which is engageable with the plug 80. When pressure is applied to the expansible chamber 82, the adapter unit 77 is thus locked in a preselected position along the length of the carrier 79, and when such pressure is released, the adapter unit 77 is free to be moved with respect to the carrier 79 which preferably is disposed under a fixed overhead guard 84.

Normally, there will be an expansible chamber 82 disposed at opposite ends of the adapter unit 77, and each of these needs a fluid line which enables adjustment of the position of the adapter unit 77 along the carrier 79. Similarly, the fluid ports 51, 52 require fluid lines. To this end, I have provided an elongated tray 85 and an elongated tray 86, both of which are horizontal and which are supported beneath the housing 20, for example by the carrier 79 or by a stationary portion of the machine tool. Within each of the trays 85, 86, there is disposed a flexible hose 87, 88 each of which is arranged in a U-shaped manner in a horizontal position wherein the legs of the U-shape extend along the length of the respective trays 85, 86. One end of each hose 87, 88 is connected to a source of pressurized fluid. The other end of the hose 88 is indicated by the numeral 89 and is connected to the port 51. The other end of the hose 87 terminates in a 3-way fitting 90 having one hose portion 91 leading to the expansible chamber 82, a second hose portion 92 leading to the part 52, and a third hose portion 93 leading to the other expansible chamber (not illustrated). The hose support structure 85—88 enables the clamp assembly 15 to be adjusted along the length of the carrier 16 or the carrier 79, and provides negligible interference with the vertical movement of the housing 20 within the adapter units 38, 77.

I claim as my invention:

1. A machine-tool clamp assembly for acting between an elongated horizontally movable carrier on the machine tool and a workpiece, comprising:
   a. a rigid adapter unit having means for clamping it at a selected point along the length of the elongated horizontally movable carrier;
   b. an actuator-housing unit disposed at a position adjacent to said rigid adapter unit;
   c. vertical guide rod means extending into said hosing unit and into said adapter unit, and having a free sliding fit with one of said units and being rigidly secured to the other of said units;
   d. an actuator piston slidably disposed in said actuator housing unit; and
   e. at least one clamp member operatively connected to said piston and slidably guided by said housing unit form linear clamping and unclamping movement toward and away from the workpiece, such movement having a vertical vector for such clamping.

2. A machine-tool clamp assembly according to claim 1, in which said adapter unit has vertically spaced portions respectively receiving the upper and lower ends of said guide rod means, said housing unit being disposed for vertical movement between said vertically spaced portions.

3. A machine-tool clamp assembly according to claim 2, in which said vertical guide rod means have a cross-sectional configuration which enables said housing unit to move solely in the vertical direction without angular movement about a vertical axis.

4. A machine-tool clamp assembly for acting between an elongated movable carrier on the machine tool and a workpiece, comprising:
   a. a housing unit for being disposed at a position along one side of the carrier;
   b. a powered actuator carried by said housing;
   c. at least one clamp member movably carried by said housing unit and operatively connected to said actuator for vertical movement toward and away from the workpiece;
   d. a rigid adapter unit having means for securing it to the carrier;
   e. vertical guide rod means extending into said housing unit and into said adapter unit, and having a sliding fit with one of said units and being rigidly secured to the other of said units; and
   f. a spring acting between said units in a vertical direction for supporting said housing unit in a vertical position from which it may yield in either vertical direction in response to forces derived from the workpiece.

5. A machine-tool clamp assembly according to claim 4 including:
   a. vertically spaced portions on said rigid adapter unit receiving opposite ends of said guide rod means;
   b. said guide rod means comprising a pair of horizontally spaced parallel rods of circular cross section rigidly secured to said housing unit; and
   c. bearing means carried by said adapter unit and slidably guiding the upper and lower ends of each of said rods.

6. A machine-tool clamp assembly for acting between an elongated movable carrier on the machine tool and a workpiece, comprising:
   a. a housing unit for being disposed at a position along one side of the carrier;
   b. a powered actuator carried by said housing;
   c. at least one clamp member movably carried by said housing unit and operatively connected to said actuator for vertical movement toward and away from the workpiece;
   d. a rigid adapter unit having means for securing it to the carrier;
   e. vertical guide rod means extending into said housing unit and into said adapter unit, said guide rod means being rigidly secured to said housing unit, and having a sliding fit with said adapter unit; and
   f. bearing means acting between said guide rod means and said adapter unit.